(12) United States Patent
Yang et al.

(10) Patent No.: US 11,576,128 B2
(45) Date of Patent: Feb. 7, 2023

(54) WAKEUP REGION UPDATE METHOD AND DEVICE

(71) Applicant: DATANG MOBILE COMMUNICATIONS EQUIPMENT CO., LTD., Beijing (CN)

(72) Inventors: Meiying Yang, Beijing (CN); Deshan Miao, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/972,017

(22) PCT Filed: Apr. 3, 2019

(86) PCT No.: PCT/CN2019/081349
§ 371 (c)(1),
(2) Date: Dec. 4, 2020

(87) PCT Pub. No.: WO2019/233172
PCT Pub. Date: Dec. 12, 2019

(65) Prior Publication Data
US 2021/0235384 A1    Jul. 29, 2021

(30) Foreign Application Priority Data

Jun. 4, 2018    (CN) .......................... 201810566041.5

(51) Int. Cl.
*H04W 52/02*    (2009.01)
*H04B 17/318*    (2015.01)
*H04B 17/336*    (2015.01)

(52) U.S. Cl.
CPC ...... *H04W 52/0248* (2013.01); *H04B 17/318* (2015.01); *H04B 17/336* (2015.01); *H04W 52/0245* (2013.01)

(58) Field of Classification Search
CPC .......... H04W 52/0248; H04W 52/0245; H04B 17/318; H04B 17/336
See application file for complete search history.

(56) References Cited

U.S. PATENT DOCUMENTS

| 2006/0040639 A1 | 2/2006 | Karl et al. |
| 2013/0114490 A1 | 5/2013 | Fang et al. |

(Continued)

FOREIGN PATENT DOCUMENTS

| CN | 101233778 A | 7/2008 |
| CN | 101247298 A | 8/2008 |

(Continued)

OTHER PUBLICATIONS

Sony,"WUS aspects on grouping and mobility for efeMTC and feNB-IoT", 3GPP TSG RAN WG2 Meeting #100, Reno, USA, Dec. 1-2, 2017, total 7 pages, R2-1712993.

*Primary Examiner* — Deepa Belur
(74) *Attorney, Agent, or Firm* — Kilpatrick Townsend & Stockton, LLP

(57) ABSTRACT

The embodiments of the present application provide a wakeup region update method and device for updating a wakeup region of a terminal. The method includes a terminal receiving a wakeup signal, the wakeup signal carrying a wakeup region indicator; and the terminal updating the wakeup region indicator of the terminal according to the wakeup region indicator carried by the wakeup signal received. The present application is adopted to achieve updating and maintenance of the wakeup region of the terminal.

10 Claims, 6 Drawing Sheets

(56) References Cited

U.S. PATENT DOCUMENTS

| | | | |
|---|---|---|---|
| 2013/0242828 A1* | 9/2013 | Sahu | H04W 52/0216 |
| | | | 370/311 |
| 2014/0003279 A1* | 1/2014 | Ren | H04W 56/0045 |
| | | | 370/252 |
| 2014/0302879 A1 | 10/2014 | Kim et al. | |
| 2015/0319689 A1 | 11/2015 | Zhang et al. | |
| 2018/0007734 A1* | 1/2018 | Kela | H04W 52/0229 |
| 2019/0045481 A1* | 2/2019 | Sang | H04B 1/713 |
| 2019/0090191 A1* | 3/2019 | Liu | H04L 27/2613 |
| 2020/0092814 A1* | 3/2020 | Zhou | H04L 5/0098 |
| 2020/0205079 A1* | 6/2020 | Tong | H04W 72/0446 |

FOREIGN PATENT DOCUMENTS

| | | | |
|---|---|---|---|
| CN | 104322006 A | 1/2015 | |
| CN | 104838685 A | 8/2015 | |
| CN | 106877966 A | 6/2017 | |
| EP | 3582556 B1 * | 2/2022 | H04W 52/0216 |
| WO | 2014086035 A1 | 6/2014 | |
| WO | 2018176230 A1 | 10/2018 | |

* cited by examiner

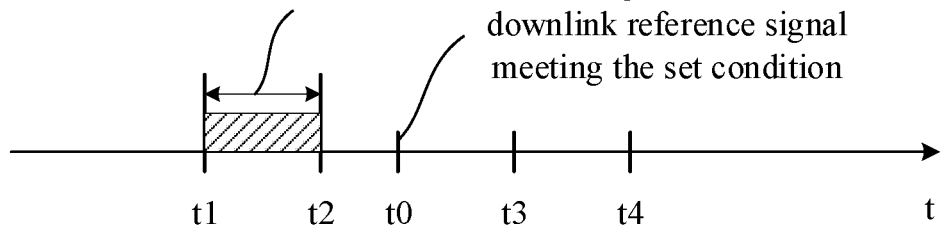

Fig. 5A

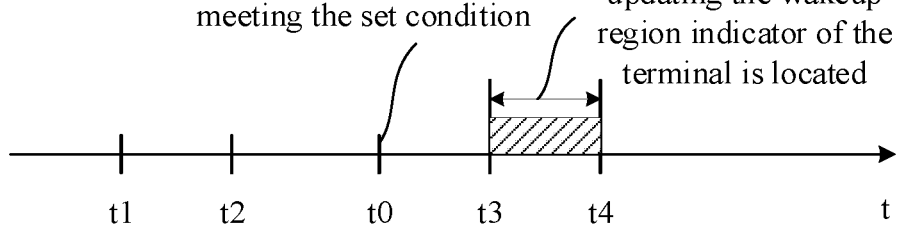

Fig. 5B

```
┌─────────────────────────────────────────────────────────┐    ┌─ S601
│  A terminal receives a wakeup signal, and the wakeup signal │
│         carries a wakeup region indicator              │
└─────────────────────────────────────────────────────────┘
                            │
                            ▼
┌─────────────────────────────────────────────────────────┐    ┌─ S602
│ The terminal transmits information of the wakeup signal to │
│                    a base station                       │
└─────────────────────────────────────────────────────────┘
                            │
                            ▼
┌─────────────────────────────────────────────────────────┐    ┌─ S603
│ The base station configures a wakeup region indicator for the │
│  terminal according to the information of the wakeup signal │
└─────────────────────────────────────────────────────────┘
```

Fig. 6

WAKEUP REGION UPDATE METHOD AND DEVICE

This application is a National Stage of International Application No. PCT/CN2019/081349, filed Apr. 3, 2019, which claims priority to China Patent Application No. 201810566041.5, filed to the China Patent Office on Jun. 4, 2018, and entitled "WAKEUP REGION UPDATE METHOD AND DEVICE", both of which are hereby incorporated by reference in their entireties.

FIELD

The present disclosure relates to the field of wireless communications, and more particularly relates to a wakeup region update method and device.

BACKGROUND

With the development of wireless communication systems, terminal types and service types are becoming increasingly diversified. In order to ensure terminal power saving and service accessibility, the industry introduces a wakeup signal called WUS. A terminal has relatively low power consumption when monitoring a wakeup signal. The terminal is awakened when receiving its own wakeup signal, and activates a communication device to receive a paging message or to receive information transmitted on a physical downlink control channel (PDCCH), or to perform radio resource management (RRM) measurement, or to receive a synchronous message, so as to achieve the objective of saving power for the terminal.

In order to further reduce the power consumption of the terminal, a wakeup region can be configured for each terminal. One wakeup region may be a signal coverage range of at least one transmitting and receiving point. The wakeup region is uniquely identified by a wakeup region indicator. After the terminal receives the wakeup signal, if the wakeup region indicator carried by the wakeup signal is the same as the wakeup region indicator configured for the terminal, the terminal is awakened, otherwise, it will not be awakened, thereby further reducing the power consumption of the terminal.

However, there is no solution for how to update a wakeup region of a terminal.

SUMMARY

The embodiments of the present disclosure provide a wakeup region update method and device for updating a wakeup region of a terminal.

In a first aspect, a wakeup signal region update method is provided, including: receiving, by a terminal, a wakeup signal, wherein the wakeup signal carries a wakeup region indicator; and updating, by the terminal, a wakeup region indicator of the terminal according to the wakeup region indicator carried by the wakeup signal received.

According to the above embodiment, after the terminal receives the wakeup signal, the wakeup region indicator of the terminal may be updated according to the wakeup region indicator carried by the wakeup signal, thereby realizing updating and maintenance of the wakeup region indicator of the terminal.

In one possible implementation mode, the method further includes: detecting, by the terminal, received energy of the wakeup signal. Correspondingly, the updating, by the terminal, the wakeup region indicator of the terminal according to the wakeup region indicator carried by the wakeup signal received includes: updating, by the terminal, the wakeup region indicator of the terminal according to the wakeup region indicator carried by the wakeup signal, in the condition that the received energy of the wakeup signal is greater than or equal to a wakeup signal energy threshold. The energy may also be called power, which is not distinguished here and may be power of unit time or power within a certain time window.

According to the above embodiment, the terminal detects the received energy of the wakeup signal, and updates, only when the received energy of the wakeup signal is greater than or equal to the wakeup signal energy threshold, the wakeup region indicator of the terminal according to the wakeup region indicator carried by the wakeup signal, so that the terminal may be awakened in the updated wakeup region, and the reliability is improved.

Further, the updating, by the terminal, the wakeup region indicator of the terminal according to the wakeup region indicator carried by the wakeup signal, in the condition that the received energy of the wakeup signal is greater than or equal to the wakeup signal energy threshold includes: selecting, by the terminal, one or more wakeup signals from a plurality of wakeup signals, in the condition that the terminal receives the plurality of wakeup signals carrying different wakeup region indicators, and the received energy of each of the plurality of wakeup signals is greater than or equal to the wakeup signal energy threshold; and updating, by the terminal, the wakeup region indicator of the terminal according to the wakeup region indicator carried by the wakeup signals selected.

Further, the selecting, by the terminal, one wakeup signal from the plurality of wakeup signals includes: randomly selecting, by the terminal, one wakeup signal from the plurality of wakeup signals; or selecting, by the terminal, a wakeup signal with a highest received energy from the plurality of wakeup signals.

In one possible implementation mode, the method further includes: detecting, by the terminal, one or more downlink reference signals received by the terminal, and acquiring, by the terminal, at least one receiving moment of a downlink reference signal meeting a set condition among the one or more downlink reference signals. The downlink reference signal includes an aperiodic on-demand reference signal (RS), or a cell reference signal (CRS), or a channel state information reference signal (CSI-RS), or a synchronous broadcast signal (SS/PBCH), or a channel state tracking reference signal (TRS). Correspondingly, the updating, by the terminal, the wakeup region indicator of the terminal according to the wakeup region indicator carried by the wakeup signal received includes: determining, by the terminal, a wakeup signal used for updating the wakeup region indicator of the terminal according to at least one receiving moment of the downlink reference signal meeting the set conditions and a relative position relationship between the wakeup signal used for updating the wakeup region indicator of the terminal and the receiving moment of the corresponding downlink reference signal, and updating, by the terminal, the wakeup region indicator of the terminal according to the wakeup region indicator carried by the wakeup signal determined. The detecting, by the terminal, the one or more downlink reference signals received by the terminal, and the acquiring, by the terminal, at least one receiving moment of a downlink reference signal meeting the set condition among the one or more downlink reference signals includes: detecting, by the terminal, received energy of the one or more downlink reference signals, and acquiring, by the terminal, at least one receiving moment of the downlink reference signal of which the received energy is greater than a reference signal energy threshold among the one or more downlink reference signals; or detecting, by the terminal, signal quality of the one or more downlink reference signals, and acquiring, by the terminal, at least one receiving moment of the downlink reference signal of which the signal quality is greater than or equal to a signal quality threshold among the one or more downlink reference signals; or detecting, by the terminal, received signal strength of the one or more downlink reference signals, and acquiring, by the terminal, at least one receiving moment of the downlink reference signal of which the received signal strength is less than or equal to a received signal strength threshold among the one or more downlink reference signals; or detecting, by the terminal, a signal to interference plus noise ratio of the one or more downlink reference signals, and acquiring, by the terminal, at least one receiving moment of the downlink reference signal of which the signal to interference plus noise ratio is greater than or equal to a signal to interference plus noise ratio threshold among the one or more downlink reference signals.

According to the above embodiment, the terminal may determine, according to the receiving moment of the downlink reference signal meeting the set condition, a receiving position of the wakeup signal used for the terminal to update the wakeup region indicator, so that the wakeup region indicator of the terminal may be updated according to the wakeup region indicator carried by the wakeup signal received at the receiving position, thereby realizing updating and maintenance of the wakeup region indicator of the terminal.

Alternatively, the relative position relationship between the wakeup signal used for updating the wakeup region indicator of the terminal and the receiving moment of the corresponding downlink reference signal includes that: the wakeup signal used for updating the wakeup region indicator of the terminal is at least one wakeup signal received within a period closest to the receiving moment of the downlink reference signal; or, the wakeup signal used for updating the wakeup region indicator of the terminal is at least one wakeup signal received within a period before the receiving moment of the downlink reference signal and closest to the receiving moment; or, the wakeup signal used for updating the wakeup region indicator of the terminal is at least one wakeup signal received after the receiving moment of the downlink reference signal and closest to the receiving moment.

In one possible implementation mode, the updating, by the terminal, the wakeup region indicator of the terminal according to the wakeup region indicator carried by the wakeup signal received includes: detecting, by the terminal, a wakeup region update timer; and updating, by the terminal, the wakeup region indicator of the terminal according to the wakeup region indicator carried by the wakeup signal received in the condition that the wakeup region update timer expires.

In a second aspect, a wakeup signal region update method is provided, including: receiving, by a terminal, a wakeup signal; transmitting, by the terminal, information of the wakeup signal to a base station, wherein the information of the wakeup signal at least includes a wakeup region indicator carried by the wakeup signal; and receiving, by the terminal, a wakeup region indicator configured, according to the information of the wakeup signal, by the base station for the terminal.

In one possible implementation mode, the information of the wakeup signal further includes received energy information of the wakeup signal. The energy may also be called power, which is not distinguished here and may be power of unit time or power within a certain time window.

In one possible implementation mode, the method further includes: detecting, by the terminal, a downlink reference signal received by the terminal; obtaining, by the terminal, information of the downlink reference signal; and transmitting, by the terminal, the information of the downlink reference signal to the base station; wherein the information of the downlink reference signal includes one or more pieces of the following information: received energy information of the downlink reference signal; signal quality information of the downlink reference signal; received signal strength of the downlink reference signal; or a signal to interference plus noise ratio of the downlink reference signal.

In a third aspect, a wakeup signal region update method is provided, including: transmitting, by a base station, a wakeup signal, wherein the wakeup signal carries a wakeup region indicator; receiving, by the base station, information, transmitted by a terminal, of a wakeup signal, wherein the information of the wakeup signal includes information of a wakeup signal transmitted by a base station covering a neighboring cell and received by the terminal, and the information of the wakeup signal at least includes a wakeup region indicator carried by the wakeup signal; and configuring, by the base station, a wakeup region indicator for the terminal according to the information of the wakeup signal.

In one possible implementation mode, the information of the wakeup signal further includes received energy information of the wakeup signal. Correspondingly, the configuring, by the base station, the wakeup region indicator for the terminal according to the information of the wakeup signal includes: configuring, by the base station, the wakeup region indicator for the terminal according to the wakeup region indicator carried by the wakeup signal of which the received energy is greater than or equal to a wakeup signal energy threshold.

Alternatively, the configuring, by the base station, the wakeup region indicator for the terminal according to the wakeup region indicator carried by the wakeup signal of which the received energy is greater than or equal to the wakeup signal energy threshold includes: selecting, by the base station, one or more wakeup signals from a plurality of wakeup signals in the condition that the information of the wakeup signal includes the plurality of wakeup signals carrying different wakeup region indicators, and the received energy of each of the plurality of wakeup signals is greater than or equal to the wakeup signal energy threshold; and configuring, by the base station, the wakeup region indicator for the terminal according to the wakeup region indicator carried by the one or more wakeup signals selected by the base station.

Alternatively, the selecting, by the base station, one wakeup signal from the plurality of wakeup signals includes: uniformly and randomly selecting, by the base station, one wakeup signal from the plurality of wakeup signals; or selecting, by the base station, a wakeup signal with a highest received energy from the plurality of wakeup signals.

In one possible implementation mode, the method further includes: receiving, by the base station, information, transmitted by the terminal, of a downlink reference signal, wherein the information of the downlink reference signal includes information of downlink reference signals transmitted by the base station and/or the base station covering the neighboring cell and received by the terminal; wherein the configuring, by the base station, the wakeup region indicator for the terminal according to the information of the wakeup signal includes: acquiring, by the base station, at least one receiving moment of a downlink reference signal meeting a set condition; determining, by the base station, a wakeup signal used for updating the wakeup region indicator of the terminal according to at least one receiving moment of the downlink reference signal meeting the set condition and a relative position relationship between the wakeup signal used for updating the wakeup region indicator of the terminal and the receiving moment of the corresponding downlink reference signal; and configuring, by the base station, the wakeup region indicator for the terminal according to the wakeup region indicator carried by the wakeup signal determined. The acquiring, by the base station, at least one receiving moment of the downlink reference signal meeting the set condition includes: acquiring, by the base station, at least one receiving moment of the downlink reference signal of which received energy is greater than a reference signal energy threshold; or acquiring, by the base station, at least one receiving moment of the downlink reference signal of which signal quality is greater than or equal to a signal quality threshold; or acquiring, by the base station, at least one receiving moment of the downlink reference signal of which received signal strength is less than or equal to a received signal strength threshold; or acquiring, by the base station, at least one receiving moment of the downlink reference signal of which a signal to interference plus noise ratio is greater than or equal to a signal to interference plus noise ratio threshold.

Alternatively, the relative position relationship between the wakeup signal used for updating the wakeup region indicator of the terminal and the receiving moment of the corresponding downlink reference signal includes that: the wakeup signal used for updating the wakeup region indicator of the terminal is at least one wakeup signal received within a period closest to the receiving moment of the downlink reference signal; or, the wakeup signal used for updating the wakeup region indicator of the terminal is at least one wakeup signal received within a period before the receiving moment of the downlink reference signal and closest to the receiving moment; or, the wakeup signal used for updating the wakeup region indicator of the terminal is at least one wakeup signal received after the receiving moment of the downlink reference signal and closest to the receiving moment.

In one possible implementation mode, the configuring, by the base station, the wakeup region indicator for the terminal according to the information of the wakeup signal includes: detecting, by the base station, a wakeup region update timer; and configuring, by the base station, the wakeup region indicator for the terminal according to the information of the wakeup signal in the condition that the wakeup region update timer expires.

In a fourth aspect, a terminal is provided, including: a receiving device, configured to receive a wakeup signal, wherein the wakeup signal carries a wakeup region indicator; and an update device, configured to update a wakeup region indicator of the terminal according to the wakeup region indicator carried by the wakeup signal received.

In one possible implementation mode, the terminal further includes a detection device. The detection device is configured to detect received energy of the wakeup signal. The update device is specifically configured to: update the wakeup region indicator of the terminal according to the wakeup region indicator carried by the wakeup signal, in the condition that the received energy of the wakeup signal is greater than or equal to a wakeup signal energy threshold.

In one possible implementation mode, the terminal further includes a detection device. The detection device is configured to detect one or more downlink reference signals received by the terminal, and acquire at least one receiving moment of a downlink reference signal meeting a set condition among the one or more downlink reference signals. The update device is specifically configured to: determine a wakeup signal used for updating the wakeup region indicator of the terminal according to at least one receiving moment of the downlink reference signal meeting the set condition and a relative position relationship between the wakeup signal used for updating the wakeup region indicator of the terminal and the receiving moment of the corresponding downlink reference signal, and update the wakeup region indicator of the terminal according to the wakeup region indicator carried by the wakeup signal determined. The detection device is specifically configured to: detect received energy of the one or more downlink reference signals, and acquire at least one receiving moment of the downlink reference signal of which the received energy is greater than a reference signal energy threshold among the one or more downlink reference signals; or detect signal quality of the one or more downlink reference signals, and acquire at least one receiving moment of the downlink reference signal of which the signal quality is greater than or equal to a signal quality threshold among the one or more downlink reference signals; or detect received signal strength of the one or more downlink reference signals, and acquire at least one receiving moment of the downlink reference signal of which the received signal strength is less than or equal to a received signal strength threshold among the one or more downlink reference signals; or detect a signal to interference plus noise ratio of the one or more downlink reference signals, and acquire at least one receiving moment of the downlink reference signal of which the signal to interference plus noise ratio is greater than or equal to a signal to interference plus noise ratio threshold among the one or more downlink reference signals.

In a fifth aspect, a terminal is provided, including: a receiving device, configured to receive a wakeup signal; and a transmission device, configured to transmit information of the wakeup signal to a base station. The receiving information at least includes a wakeup region indicator carried by the wakeup signal; and the receiving device is also configured to receive a wakeup region indicator configured by the base station for the terminal according to the information of the wakeup signal.

In one possible implementation mode, the information of the wakeup signal further includes received energy information of the wakeup signal.

In one possible implementation mode, the receiving device is also configured to receive and detect a downlink reference signal, and obtain information of the downlink reference signal; the transmission device is also configured to transmit the information of the downlink reference signal to the base station. The information of the downlink reference signal includes one or more pieces of the following information: received energy information of the downlink reference signal; signal quality information of the downlink reference signal; received signal strength of the downlink reference signal; or a signal to interference plus noise ratio of the downlink reference signal.

In a sixth aspect, a base station is provided, including: a transmission device, configured to transmit a wakeup signal, wherein the wakeup signal carries a wakeup region indicator; a receiving device, configured to receive information, transmitted by a terminal, of a wakeup signal, wherein the information of the wakeup signal includes information of a wakeup signal transmitted by a base station covering a neighboring cell and received by the terminal, and the information of the wakeup signal at least includes a wakeup region indicator carried by the wakeup signal; and a configuration device, configured to configure a wakeup region indicator for the terminal according to the information of the wakeup signal.

In one possible implementation mode, the information of the wakeup signal further includes received energy information of the wakeup signal. The configuration device is specifically configured to: configure the wakeup region indicator for the terminal according to the wakeup region indicator carried by the wakeup signal of which the received energy is greater than or equal to a wakeup signal energy threshold.

In one possible implementation mode, the receiving device is also configured to: receive information, transmitted by the terminal, of a downlink reference signal, wherein the information of the downlink reference signal includes information of downlink reference signals transmitted by the base station and/or the base station covering the neighboring cell and received by the terminal. The configuration device is further configured to: acquire at least one receiving moment of a downlink reference signal meeting a set condition, determine a wakeup signal used for updating the wakeup region indicator of the terminal according to at least one receiving moment of the downlink reference signal meeting the set conditions and a relative position relationship between the wakeup signal used for updating the wakeup region indicator of the terminal and the receiving moment of the corresponding downlink reference signal, and configure a wakeup region indicator for the terminal according to the wakeup region indicator carried by the determined wakeup signal. The configuration device is further configured to: acquire at least one receiving moment of the downlink reference signal of which received energy is greater than a reference signal energy threshold; or, acquire at least one receiving moment of the downlink reference signal of which signal quality is greater than or equal to a signal quality threshold; or, acquire at least one receiving moment of the downlink reference signal of which received signal strength is less than or equal to a received signal strength threshold; or, acquire at least one receiving moment of the downlink reference signal of which a signal to interference plus noise ratio is greater than or equal to a signal to interference plus noise ratio threshold.

In a seventh aspect, a communication device is provided, including: a processor, a memory and a transceiver. The processor is configured to read programs in the memory to implement the method in the first aspect.

In an eighth aspect, a communication device is provided, including: a processor, a memory and a transceiver. The processor is configured to read programs in the memory to implement the method in the second aspect.

In a ninth aspect, a communication device is provided, including: a processor, a memory and a transceiver. The processor is configured to read programs in the memory to implement the method in the third aspect.

In a tenth aspect, a computer-readable storage medium is provided. The computer-readable storage medium stores a computer-executable instruction. The computer-executable instruction is configured to cause a computer to implement the method in the first aspect.

In an eleventh aspect, a computer-readable storage medium is provided. The computer-readable storage medium stores a computer-executable instruction. The computer-executable instruction is configured to cause a computer to implement the method in the second aspect.

In a twelfth aspect, a computer-readable storage medium is provided. The computer-readable storage medium stores a computer-executable instruction. The computer-executable instruction is configured to cause a computer to implement the method in the third aspect.

BRIEF DESCRIPTION OF THE DRAWINGS

To describe the embodiments of the present disclosure more clearly, drawings required to be used in the embodiments of the present disclosure will be briefly introduced below. Apparently, the drawings described below are only some embodiments of the present disclosure.

FIG. 5A and FIG. 5B are respectively schematic diagrams of relative position relationships between a receiving moment of a downlink reference signal meeting a set condition and a receiving moment of a wakeup signal used for a terminal to update a wakeup region indicator in the embodiments of the present disclosure.

FIG. 6 is still another schematic diagram of a wakeup region update flow provided by the embodiments of the present disclosure.

DETAILED DESCRIPTION OF THE EMBODIMENTS

The embodiments of the present disclosure provide a wakeup region update solution. Based on the embodiments of the present disclosure, a terminal may measure and detect a wakeup signal to realize updating and maintenance of a wakeup region. The embodiments of the present disclosure can be applicable to a 5G system or an evolution system thereof.

The embodiments of the present disclosure are described in detail below in combination with the drawings.

Figure 1:
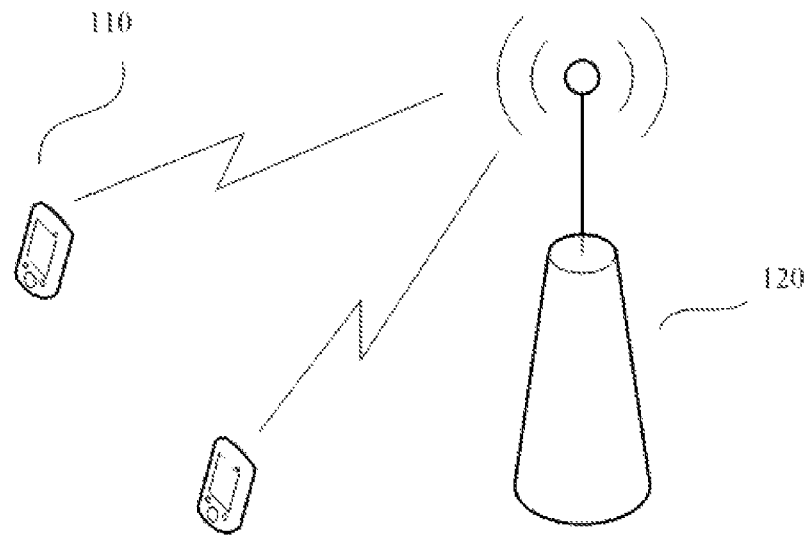
FIG. 1 is a schematic diagram of a network architecture according to the embodiments of the present disclosure.

Referring to FIG. 1, it is a schematic diagram of a possible communication scene provided by the embodiments of the present disclosure. As shown in FIG. 1, a terminal 110 accesses a radio network by means of a radio access network (RAN) node 120, so as to acquire services of an outer net (such as the Internet) through the radio network, or to communicate with other terminals through the radio network.

The terminal is also called a user equipment (UE), a mobile station (MS), a mobile terminal (MT), etc., which is a device that provides users with voice and/or data connectivity, such as, a handheld device with wireless connectivity and an on-board device. At present, some examples of terminals are: a mobile phone, a tablet, a laptop, a handheld computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, etc.

The RAN is the part in a network that connects a terminal to the radio network. A RAN node (or device) is a node (or device) in the RAN, and can also be called a base station. At present, some examples of RAN nodes are: a 5G base station (gNB), a transmission reception point (TRP), an evolved Node B (eNB), a radio network controller (RNC), a node B (NB), a base station controller (BSC), a base transceiver station (BTS), a home base station (i.e., home evolved NodeB, or home Node B (HNB)), a base band unit (BBU), or a wireless fidelity (Wifi) access point (AP), etc. In addition, in a network structure, the RAN may include a centralized unit (CU) node and a distributed unit (DU) node.

The aforementioned communication architecture may be a 5G system or its evolution system.

The embodiments of the present disclosure are described by taking a base station and a terminal for example. The base station can transmit a wakeup signal, and the terminal can measure and detect the wakeup signal, and realize updating and maintenance of the wakeup region based on measurement and detection results. The terminal can also transmit the measurement and detection results for the wakeup signal to the base station, and the base station configures a wakeup region for the terminal according to the measurement and detection results.

In the embodiments of the present disclosure, the wakeup region is a region in which a wakeup signal is transmitted uniformly, and the terminal can receive the wakeup signal in the wakeup region. The wakeup region may be at least one TRP. The sequence of the wakeup signal carries a wakeup region indicator. Alternatively, it may also carry other information.

The wakeup region indicator is a unique indicator of the wakeup region, and may be a group of sequences. The wakeup region indicator may be a first level of information of a multi-level wakeup signal sequence.

A wakeup region update method provided by the embodiments of the present disclosure is described in detail below in combination with the accompanying drawing.

Figure 2:
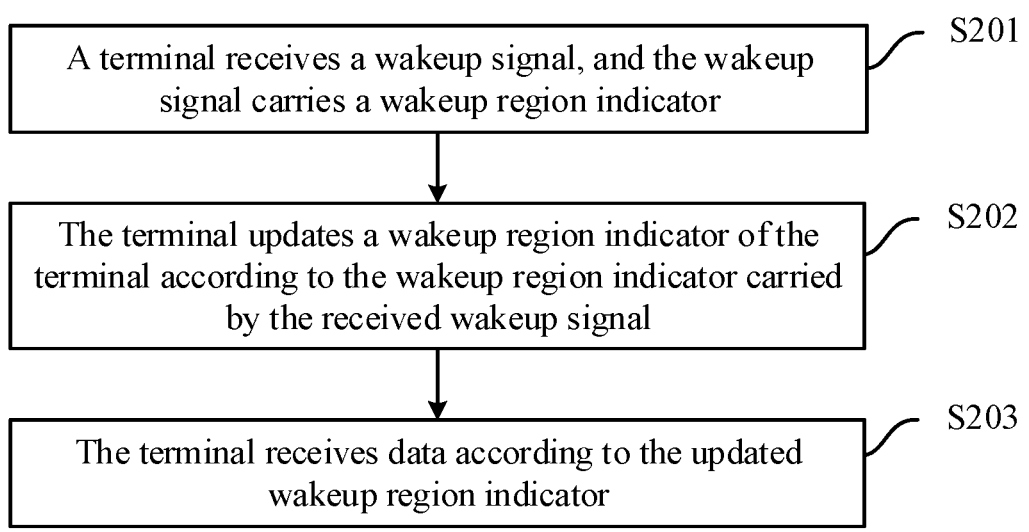
FIG. 2 is a schematic diagram of a wakeup region update flow provided by the embodiments of the present disclosure.

Referring to FIG. 2, illustrating a schematic diagram of a wakeup region update flow provided by the embodiments of the present disclosure, as shown in the figure, the flow may include the following steps.

S201: a terminal receives a wakeup signal, and the wakeup signal carries a wakeup region indicator.

The terminal is subjected to energy saving configuration. In one scene, when a terminal subjected to energy saving configuration is in an idle state, the terminal enters a sleep state with extremely low power consumption. If a network side has downlink data to be transmitted to the terminal, the network side transmits a wakeup signal to the terminal, and the terminal is awakened after receiving the wakeup signal, and starts to receive data from and transmit data to the network side. After the data is transmitted and received completely, the terminal enters the sleep state with extremely low power consumption again. In another scene, when the terminal is in a connected inactivate state, the terminal enters the sleep state with extremely low power consumption. When the network side has downlink data to be received by the terminal, the network side transmits a wakeup signal to the terminal, and the terminal is awakened after receiving the wakeup signal, and starts to receive data from and transmit data to the network.

In S201, the terminal may receive one wakeup signal, or may receive a plurality of wakeup signals. Alternatively, the wakeup signals received by the terminal may include a wakeup signal of a wakeup region to which the terminal currently belongs, or may include a wakeup signal of a wakeup region adjacent to the wakeup region to which the terminal currently belongs.

S202: the terminal updates a wakeup region indicator of the terminal according to the wakeup region indicator carried by the received wakeup signal.

Alternatively, if the terminal determines that the wakeup region indicator carried by the received wakeup signal is different from the wakeup region indicator of the terminal, the terminal updates the wakeup region indicator of the terminal to the wakeup region indicator carried by the received wakeup signal, otherwise, the terminal does not update the wakeup region indicator of the terminal.

Alternatively, the terminal may update, after receiving the wakeup signal for a set period, the wakeup region indicator of the terminal according to the wakeup region indicator carried by the received wakeup signal. The set period is configurable. During specific implementation, a timer used for updating the wakeup region indicator can be configured, and the timer may be called a wakeup region update timer. When receiving the wakeup signal, the terminal may initiate the timer. If the terminal determines that the wakeup region indicator needs to be updated, the terminal may implement an operation of updating the wakeup region indicator when the timer expires. By means of the method, the frequent updating of the wakeup region indicator can be prevented to improve the system stability. For example, the signal coverage range of a TRP 1 is a wakeup region 1, and the signal coverage range of a TRP 2 is a wakeup region 2. If the terminal moves from the signal coverage range of the TRP 1 to the signal coverage range of the TRP 2, but moves back to the signal coverage range of the TRP 1 within very short time (such as within the time before the wakeup region update timer expires), the above solution is adopted to keep the wakeup region 1 unchanged, rather than updating the wakeup region indicator of the terminal from the wakeup region 1 to the wakeup region 2 and then back to the wakeup region 1, so as to improve the system stability.

Alternatively, if the terminal receives a plurality of wakeup signals, the terminal may update the wakeup region indicator of the terminal according to the wakeup region indicator carried by at least one of the plurality of received wakeup signals. Specifically, in one possible implementation mode, if the terminal receives a plurality of wakeup signals carrying different wakeup region indicators, the terminal may select one wakeup signal from the plurality of wakeup signals carrying different wakeup region indicators, and updates the wakeup region indicator of the terminal according to the wakeup region indicator carried by the selected wakeup signal. In another possible implementation mode, if the terminal receives a plurality of wakeup signals carrying different wakeup region indicators, the terminal may select partial or all wakeup signals from the plurality of wakeup signals carrying different wakeup region indicators, and may select a plurality of wakeup region indicators, and uses the plurality of wakeup region indicators selected to update the wakeup region indicator of the terminal. The plurality of wakeup region indicators of the terminal can expand the wakeup region of the terminal. For example, if the terminal receives a wakeup signal, and as long as the wakeup region indicator carried by the wakeup signal is the same as one of the plurality of wakeup region indicators of the terminal, the terminal will be awakened.

The terminal may select, according to a set principle, one wakeup region indicator from the plurality of wakeup region indicators detected in the plurality of wakeup signals. For example, the set principle may specifically randomly select a wakeup region indicator, or may select a first received wakeup region indicator.

Further, in the above flow, after S202, the method may further include S203.

S203: the terminal receives data according to the updated wakeup region indicator.

Specifically, the terminal may receive the data after the wakeup signal and the wakeup signal according to the updated wakeup region indicator. The data may include data transmitted on a physical downlink control channel (PDCCH), data transmitted on a physical downlink shared channel (PDSCH), a paging message, and the like.

It can be seen through the above flow that the embodiment of the present disclosure updates the wakeup region indicator of the terminal according to the wakeup region indicator carried by the received wakeup signal by means of the terminal receiving the wakeup signal, thus realizing updating and maintenance of the wakeup region indicator.

Figure 3:
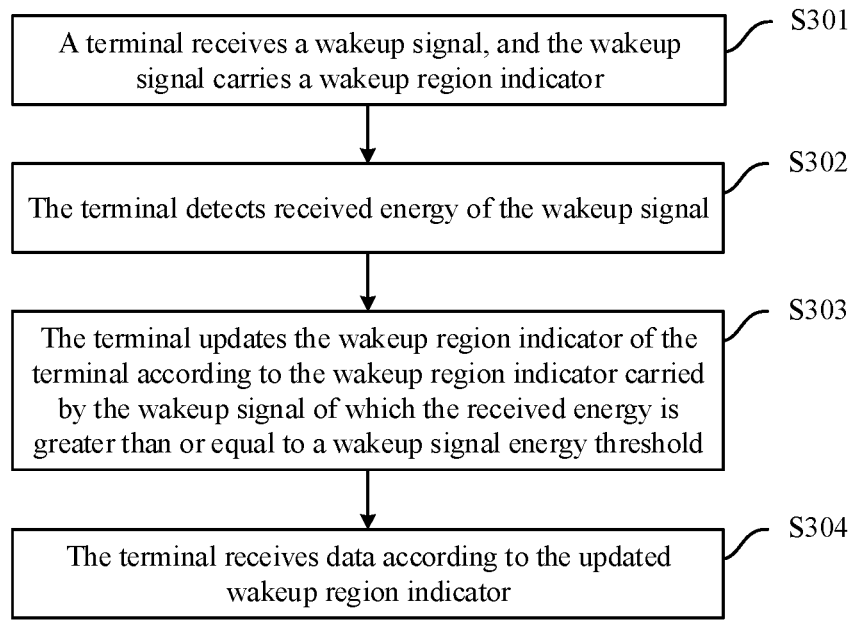
FIG. 3 is another schematic diagram of a wakeup region update flow provided by the embodiments of the present disclosure.

Referring to FIG. 3, it is a schematic diagram of a wakeup region update flow provided by the embodiments of the present disclosure. As shown in the figure, the flow may include the following steps.

S301: a terminal receives a wakeup signal, and the wakeup signal carries a wakeup region indicator.

Specific realization of this step may refer to S201 in FIG. 2, so no more repeated descriptions are provided.

S302: the terminal detects received energy of the wakeup signal.

The received energy of the wakeup signal may be characterized by received power or received quality of the wakeup signal, or other relevant parameters capable of characterizing the received energy of a signal.

For example, the terminal may detect one or more of the following parameters of the wakeup signal to characterize the received energy of the signal: reference signal received power (RSRP), reference signal received quality (RSRQ), and a reference signal strength indicator (RSSI). Which type of parameters of the wakeup signal is detected by the terminal may be configured by a base station.

S303: the terminal updates the wakeup region indicator of the terminal according to the wakeup region indicator carried by the wakeup signal of which the received energy is greater than or equal to a wakeup signal energy threshold.

The wakeup signal energy threshold may be configured by the base station, or may be configured by the terminal.

Alternatively, if the terminal determines that the wakeup region indicator carried by the received wakeup signal of which the received energy is greater than or equal to the wakeup signal energy threshold is different from the wakeup region indicator of the terminal, the terminal updates the wakeup region indicator of the terminal to the wakeup region indicator carried by the received wakeup signal, otherwise, the terminal does not update the wakeup region indicator of the terminal.

Further, the wakeup signal energy threshold may include a first signal energy threshold and a second signal energy threshold. The first signal energy threshold and the second signal energy threshold may be the same or different. In one possible implementation mode, if the terminal receives one wakeup signal, and the received energy of the wakeup signal is greater than or equal to the first signal energy threshold, the terminal updates the wakeup region indicator of the terminal according to the wakeup region indicator carried by the wakeup signal. In another possible implementation mode, if the terminal receives a plurality of wakeup signals carrying the same wakeup region indicator, and the received energy of each of the plurality of wakeup signals is greater than or equal to the first signal energy threshold, the terminal updates the wakeup region indicator of the terminal according to the wakeup region indicator carried by the plurality of wakeup signals. In another possible implementation mode, if the terminal receives a plurality of wakeup signals carrying different wakeup region indicators, and the received energy of each of the plurality of wakeup signals is greater than or equal to the second signal energy threshold, the terminal selects one wakeup signal from the plurality of wakeup signals, or selects partial or all wakeup signals from the plurality of wakeup signals, and updates the wakeup region indicator of the terminal according to the wakeup region indicators carried by the selected wakeup signals.

The method that the terminal selects one wakeup signal from the plurality of wakeup signals includes: the terminal uniformly and randomly selects one wakeup signal from the plurality of wakeup signals, or the terminal selects the wakeup signal with the highest received energy from the plurality of wakeup signals, or the terminal uses other methods to select the wakeup signals. The methods are not enumerated here. The uniform and random selection may be realized by a uniformness and randomness correlation algorithm, and may realize a symmetric probability distribution. That is, the distribution probability at the same length interval is equiprobable.

Alternatively, after receiving the wakeup signal for a set period, the terminal may update the wakeup region indicator of the terminal. The set period is configurable. During specific implementation, a timer used for updating the wakeup region indicator can be configured, and the timer may be called a wakeup region update timer. When receiving the wakeup signal, the terminal may initiate the timer. If the terminal determines that the wakeup region indicator needs to be updated, the terminal may implement an operation of updating the wakeup region indicator when the timer expires. By means of the method, the wakeup region indicator can be frequently updated to improve the system stability.

Further, in the above flow, after S303, the method may further include the following step.

S304: the terminal receives data according to the updated wakeup region indicator.

Specifically, the terminal may receive the data after the wakeup signal and the wakeup signal according to the updated wakeup region indicator. The data may include data transmitted on a PDCCH, data transmitted on a PDSCH, a paging message, and the like.

It can be seen through the above flow that the embodiment of the present disclosure updates the wakeup region indicator of the terminal according to the wakeup region indicator carried by the received wakeup signal meeting a received energy requirement by means of the terminal receiving the wakeup signal and detecting the received energy, thus realizing updating and maintenance of the wakeup region indicator.

Figure 4:
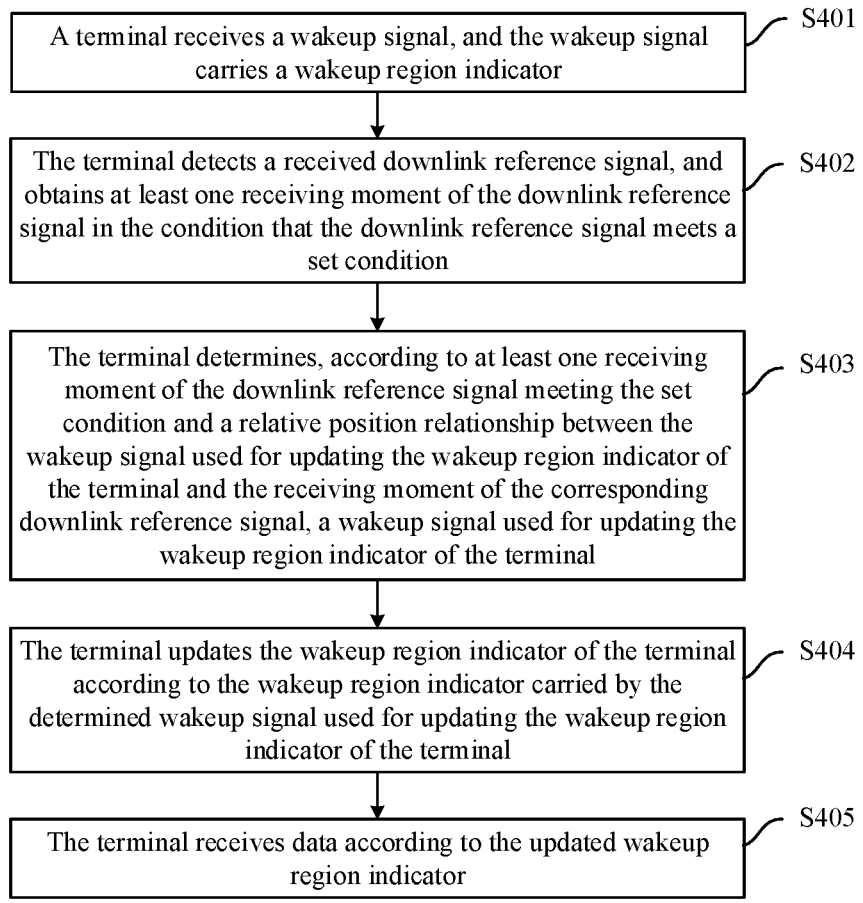
FIG. 4 is yet another schematic diagram of a wakeup region update flow provided by the embodiments of the present disclosure.

Referring to FIG. 4, it is a schematic diagram of a wakeup region update flow provided by the embodiments of the present disclosure. As shown in the figure, the flow may include the following steps.

S401: a terminal receives a wakeup signal, and the wakeup signal carries a wakeup region indicator.

Specific realization of this step may refer to S201 in FIG. 2, so no more repeated descriptions are provided.

S402: the terminal detects a received downlink reference signal, and obtains at least one receiving moment of the downlink reference signal in the condition that the downlink reference signal meets a set condition.

The terminal may detect one or more of parameters, such as received energy, received power, signal quality, signal interference, a strength indicator and a signal to interference plus noise ratio, of the downlink reference signal.

Alternatively, the downlink reference signal includes one or more of the following reference signals.

An aperiodic on-demand reference signal (RS). The on-demand RS is a reference signal specially used for radio resource management (RRM) measurement, has a denser signal pattern, and is periodically or aperiodically transmitted to help an idle or connected terminal to perform the RRM measurement. The on-demand RS can serve one or more users, is required at a specific moment only during the RRM measurement, and has controllable expenses. In the embodiment of the present disclosure, the terminal can periodically or aperiodically detect the energy of the on-demand RS, and can specifically detect one or more parameters in the RSRP, the RSRQ, the RSSI and the SINR. The base station may configure specific detection of which type of parameters.

A primary synchronization signal (PSS). The terminal may periodically or aperiodically detect the energy of the PSS, and may specifically detect one or more parameters of the RSRP, the RSRQ, the RSSI and the SINR of the PSS. The base station may configure specific detection of which type of parameters.

A secondary synchronization signal (SSS). The terminal may periodically or aperiodically detect the energy of the SSS, and may specifically detect one or more parameters of the RSRP, the RSRQ, the RSSI and the SINR of the SSS. The base station may configure specific detection of which type of parameters.

A cell reference signal (CRS). The terminal may periodically or aperiodically detect the energy of the CRS, and may specifically detect one or more parameters of the RSRP, the RSRQ, the RSSI and the SINR of the CRS. The base station may configure specific detection of which type of parameters.

A channel state information reference signal (CSI-RS). The terminal may periodically or aperiodically detect the energy of the CSI-RS, and may specifically detect one or more parameters of the RSRP, the RSRQ, the RSSI and the SINR of the CSI-RS. The base station may configure specific detection of which type of parameters.

A synchronization signal/PBCH (SSB). The terminal may periodically or aperiodically detect the energy of the SSB, and may specifically detect one or more parameters of the RSRP, the RSRQ, the RSSI and the SINR of the SSB. The base station may configure specific detection of which type of parameters.

A tracking reference signal (TRS). The terminal may periodically or aperiodically detect the energy of the TRS, and may specifically detect one or more parameters of the RSRP, the RSRQ, the RSSI and the SINR of the TRS. The base station may configure specific detection of which type of parameters.

The set condition may be pre-appointed, or configured by the base station, or configured by the terminal. The corresponding condition can be set according to the parameter type of the detected downlink reference signal. In principle, a downlink reference signal with relatively high received energy or relatively high received power or relatively good signal quality is obtained by means of the set condition.

For example, the terminal may detect a downlink reference signal by means of the following methods, and obtains at least one receiving moment of a downlink reference signal meeting the set condition.

Method 1: the terminal detects the received energy of one or more downlink reference signals, and acquires at least one receiving moment of a downlink reference signal of which the received energy is greater than a reference signal energy threshold among one or more downlink reference signals. The reference signal energy threshold may be configured by the base station, or may be configured by the terminal, or may be pre-appointed. The reference signal energy threshold and the wakeup signal energy threshold may be the same or different.

The received energy of the downlink reference signal may be characterized by the received power. Correspondingly, in the method, the terminal detects the received power of the downlink reference signal, and acquires at least one receiving moment of the downlink reference signal of which the received power is greater than a signal power threshold. The signal power threshold may be configured by the base station, or may be configured by the terminal, or may be pre-appointed.

Method 2: the terminal detects the signal quality of one or more downlink reference signals, and acquires at least one receiving moment of a downlink reference signal of which the signal quality is greater than a signal quality threshold among one or more downlink reference signals. The signal quality threshold may be configured by the base station, or may be configured by the terminal, or may be pre-appointed.

Method 3: the terminal detects the signal interference of one or more downlink reference signals, and acquires at least one receiving moment of a downlink reference signal of which the signal interference is less than or equal to a signal interference threshold among one or more downlink reference signals. The signal interference threshold may be configured by the base station, or may be configured by the terminal, or may be pre-appointed.

Method 4: the terminal detects the received signal strength of one or more downlink reference signals, and acquires at least one receiving moment of a downlink reference signal of which the received signal strength is less than or equal to a received signal strength threshold among one or more downlink reference signals. The received signal strength threshold may be configured by the base station, or may be configured by the terminal, or may be pre-appointed.

Method 5: the terminal detects the SINR of one or more downlink reference signals, and acquires at least one receiving moment of a downlink reference signal of which the SINR is greater than or equal to an SINR threshold among one or more downlink reference signals. The SINR threshold may be configured by the base station, or may be configured by the terminal, or may be pre-appointed.

In the above method, one or more receiving moments of the downlink reference signal meeting the set condition may be obtained, so that a receiving position of the wakeup signal used for updating the wakeup region indicator of the terminal is determined according to the receiving moment.

It should be noted that the executions of S401 and S402 do not have a strict order. S401 or S402 may be implemented for many times.

S403: the terminal determines, according to at least one receiving moment of the downlink reference signal meeting the set condition and a relative position relationship between the wakeup signal used for updating the wakeup region indicator of the terminal and the receiving moment of the corresponding downlink reference signal, a wakeup signal used for updating the wakeup region indicator of the terminal.

The relative position relationship between the wakeup signal used for updating the wakeup region indicator of the terminal and the receiving moment of the corresponding downlink reference signal may be pre-appointed, or may be configured by the base station, or may also be configured by the terminal. The embodiments of the present disclosure do not limit this.

When there are many receiving moments of the downlink reference signals meeting the set condition, the relative position relationship between each receiving moment of the downlink reference signal meeting the set condition and the wakeup signal used for updating the wakeup region indicator of the terminal may be respectively determined, and the wakeup signal used for updating the wakeup region indicator of the terminal is determined according to the position relationship.

For example, the relative position relationship may include the following several cases.

Case 1: the wakeup signal used for updating the wakeup region indicator of the terminal is at least one wakeup signal received within a period closest to the receiving moment of the downlink reference signal meeting the set condition.

The length of the period may be pre-appointed, or configured by the base station, or configured by the terminal. The length of the period may also be set to be zero, which indicates that the wakeup signal used for updating the wakeup region indicator of the terminal is the wakeup signal closest to the receiving moment of the downlink reference signal meeting the set condition.

As shown in FIG. 5A and FIG. 5B, the moment t0 is the receiving moment of the downlink reference signal meeting the set condition; the moment t2 is the receiving moment, before t0 and closest to t0, of the wakeup signal; and the moment t3 is the receiving moment of the wakeup signal, behind t0 and closest to t0, of the wakeup signal. A time length between t1 and t2 and a time length between t3 and t4 are equal to a set time length.

As shown in FIG. 5A, if a time length from the first time point between t1 and t2 to t0 is less than a time length from the second time point between t3 and t4 to t0, one or more wakeup signals received within the period between t1 and t2 are used as wakeup signals used for updating the wakeup region indicator of the terminal. Alternatively, if one wakeup signal in this period is selected, the wakeup signal received at t2 may be selected.

As shown in FIG. 5B, if the time length from the third time point between t3 and t4 to t0 is less than the time length from the fourth time point between t1 and t2 to t0, one or more wakeup signals received within the period between t3 and t4 are used as wakeup signals used for updating the wakeup region indicator of the terminal. Alternatively, if one wakeup signal in this period is selected, the wakeup signal received at t3 may be selected.

Case 2: the wakeup signal used for updating the wakeup region indicator of the terminal is at least one wakeup signal received within a period before the receiving moment of the downlink reference time and closest to the receiving moment.

Case 3: the wakeup signal used for updating the wakeup region indicator of the terminal is at least one wakeup signal received within a period after the receiving moment of the downlink reference signal and closest to the receiving moment.

The above enumerative relative position relationships are only examples, and the embodiments of the present disclosure do not limit this.

By means of the above relative position relationships, the receiving moment of the wakeup signal used for updating the wakeup region indicator of the terminal may be located according to the receiving moment of the downlink reference signal meeting the set conditions, and then the wakeup region indicator of the terminal is updated according to the wakeup region indicator carried by the wakeup signal received at this moment.

Alternatively, if there are a plurality of downlink reference signals meeting the set condition, the terminal may select one downlink reference signal from the plurality of downlink reference signals meeting the condition, and determine, according to the receiving moment of the selected downlink reference signal and the relative position relationship between the wakeup signal used for updating the wakeup region indicator of the terminal and this receiving moment, a position of the wakeup signal used for updating the wakeup region indicator of the terminal.

The terminal can select, according to a set principle, one downlink reference signal from the plurality of downlink reference signals meeting the set condition. For example, the set principle may specifically be uniform and random selection, or may also be to select the firstly received downlink reference signal meeting the above conditions, or may be to select the downlink reference signal with the highest received energy or the highest received power or the best signal quality or the least interference.

S404: the terminal updates the wakeup region indicator of the terminal according to the wakeup region indicator carried by the determined wakeup signal used for updating the wakeup region indicator of the terminal.

Alternatively, if the terminal determines that the wakeup region indicator carried by the wakeup signal is different from the wakeup region indicator of the terminal, the terminal updates the wakeup region indicator of the terminal to the wakeup region indicator carried by the determined wakeup signal, otherwise, the terminal does not update the wakeup region indicator of the terminal.

Alternatively, the terminal may update, after a set time length, the wakeup region indicator of the terminal according to the wakeup region indicator carried by the received wakeup signal. The set period is configurable. During specific implementation, a timer used for updating the wakeup region indicator can be configured, and the timer may be called a wakeup region update timer. When receiving the wakeup signal, the terminal may initiate the timer. If the terminal determines that the wakeup region indicator needs to be updated, the terminal may implement an operation of updating the wakeup region indicator when the timer expires. By means of the method, the frequent updating of the wakeup region indicator can be prevented to improve the system stability.

Further, in the above flow, after S404, the method may further include the following step.

S405: the terminal receives data according to the updated wakeup region indicator.

Specifically, the terminal may receive the wakeup signal and the data after the wakeup signal according to the updated wakeup region indicator. The data may include data transmitted on a PDCCH, data transmitted on a PDSCH, a paging message, and the like.

It can be seen from the above flow that the embodiment of the present disclosure determines, according to the receiving moment of the reference signal meeting the set conditions a receiving position of the wakeup signal used for updating the wakeup region indicator of the terminal by means of the terminal receiving the wakeup signal and detecting the downlink reference signal, so that the wakeup region indicator of the terminal is updated according to the wakeup region indicator carried by the wakeup signal received at this position, thereby realizing updating and maintenance of the wakeup region indicator.

Referring to FIG. 6, it is a schematic diagram of a wakeup region update flow provided by the embodiments of the present disclosure. As shown in the figure, the flow may include the following steps.

S601: a terminal receives a wakeup signal, and the wakeup signal carries a wakeup region indicator.

Specific realization of this step may refer to S201 in FIG. 2, so no more repeated descriptions are provided.

S602: the terminal transmits information of the wakeup signal to a base station.

The information, transmitted by the terminal to the base station, of the wakeup signal includes information of a wakeup signal transmitted by a base station covering a neighboring cell and received by the terminal, and may also include information of a wakeup signal transmitted by other service base stations and received by the terminal. The information of the wakeup signal at least includes a wakeup region indicator carried by the wakeup signal.

Alternatively, the terminal may transmit the information of one wakeup signal to the base station, and may also transmit the information of a plurality of wakeup signals to the base station.

S603: the base station configures a wakeup region indicator for the terminal according to the information of the wakeup signal.

Alternatively, if the base station determines that the wakeup region indicator in the information of the wakeup signal is different from the wakeup region indicator of the terminal, the base station configures the wakeup region indicator carried by the received wakeup signal for the terminal, otherwise, the base station may not re-configure a wakeup region indicator for the terminal.

Alternatively, the base station may configure, after receiving the wakeup signal for a set period, the wakeup region indicator for the terminal according to the wakeup region indicator carried by the received wakeup signal. The set period is configurable. During specific implementation, a timer used for updating the wakeup region indicator can be configured, and the timer may be called a wakeup region update timer. When the base station receives the information of the wakeup signal, the timer may be initiated. If the base station determines that the wakeup region indicator needs to be configured for the terminal, the base station may implement an operation of configuring the wakeup region indicator when the timer expires. By means of the method, the frequent configuration of the wakeup region indicator for the terminal can be prevented to improve the system stability. For example, the signal coverage range of a TRP 1 is a wakeup region 1, and the signal coverage range of a TRP 2 is a wakeup region 2. If the terminal moves from the signal coverage range of the TRP 1 to the signal coverage range of the TRP 2, but moves back to the signal coverage range of the TRP 1 within very short time (such as within the time before the wakeup region update timer expires), the above solution is adopted to keep the wakeup region 1 unchanged, rather than updating the wakeup region indicator of the terminal from the wakeup region 1 to the wakeup region 2 and then back to the wakeup region 1, so as to improve the system stability.

Alternatively, in one possible implementation mode, if the information of the wakeup signal received by the base station includes information of a plurality of wakeup signals carrying different wakeup region indicators, the base station may select one wakeup signal from the plurality of wakeup signals carrying different wakeup region indicators, and configures the wakeup region indicator for the terminal according to the wakeup region indicator carried by the selected wakeup signal. In another possible implementation mode, the base station may select partial or all wakeup signals from the plurality of wakeup signals carrying different wakeup region indicators, and may select a plurality of wakeup region indicators and configure the plurality of wakeup region indicators selected for the terminal. The plurality of wakeup region indicators of the terminal can expand the wakeup region of the terminal. For example, if the terminal receives a wakeup signal, and as long as the wakeup region indicator carried by the wakeup signal is the same as one of the plurality of wakeup region indicators of the terminal, the terminal will be awakened.

The base station may select one wakeup signal from the plurality of wakeup signals according to a set principle. For example, the set principle may specifically be uniform and random selection.

It can be seen through the above flow that the embodiment of the present disclosure realizes updating and maintenance of the wakeup region indicator by means of the terminal receiving the wakeup signal and transmitting the information of the wakeup signal to the base station to cause the base station to configure, according to the wakeup region indicator included in the information of the wakeup signal, the wakeup region indicator for the terminal.

Figure 7:
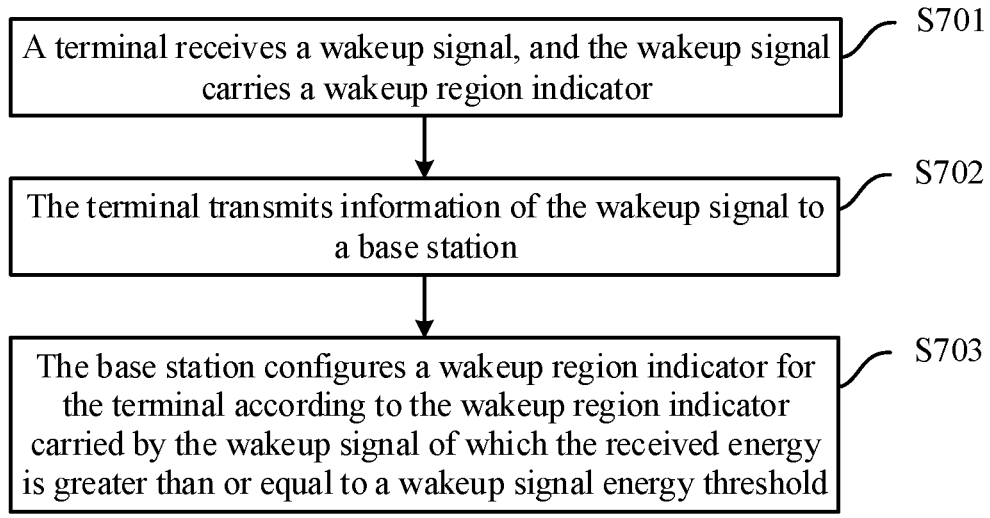
FIG. 7 is other schematic diagram of a wakeup region update flow provided by the embodiments of the present disclosure.

Referring to FIG. 7, it is a schematic diagram of a wakeup region update flow provided by the embodiments of the present disclosure. As shown in the figure, the flow may include the following steps.

S701: a terminal receives a wakeup signal, and the wakeup signal carries a wakeup region indicator.

Specific realization of this step may refer to S201 in FIG. 2, so no more repeated descriptions are provided.

S702: the terminal transmits information of the wakeup signal to a base station.

The information, transmitted by the terminal to the base station, of the wakeup signal includes information of a wakeup signal transmitted by a base station covering a neighboring cell and received by the terminal, and may also include information of a wakeup signal transmitted by other service base stations and received by the terminal. The information of the wakeup signal includes a wakeup region indicator carried in the wakeup signal, and received energy information of the wakeup signal.

The received energy of the wakeup signal may be characterized by received power or received quality of the wakeup signal, or other relevant parameters capable of characterizing the received energy of a signal.

For example, the received energy information of the wakeup signal may include one or more of the following parameters: RSRP, RSRQ and RSSI. Which type of parameters of the wakeup signal is detected and transmitted by the terminal may be configured by the base station.

Alternatively, the terminal may transmit the information of one wakeup signal to the base station, and may also transmit the information of a plurality of wakeup signals to the base station.

S703: the base station configures a wakeup region indicator for the terminal according to the wakeup region indicator carried by the wakeup signal of which the received energy is greater than or equal to a wakeup signal energy threshold among the above one or more wakeup signals received by the terminal.

The wakeup signal energy threshold may be configured by the base station, or may be configured by the terminal.

Alternatively, if the base station determines that the wakeup region indicator carried by the wakeup signal of which the received energy is greater than or equal to the wakeup signal energy threshold is different from the wakeup region indicator of the terminal, the base station configures the wakeup region indicator carried by the received wakeup signal for the terminal, otherwise, the base station does not re-configure a wakeup region indicator for the terminal.

Further, the wakeup signal energy threshold may include a first signal energy threshold and a second signal energy threshold. The first signal energy threshold and the second signal energy threshold may be the same or different. In one possible implementation mode, if the terminal transmits the information of one wakeup signal, and the received energy of the wakeup signal is greater than or equal to the first signal energy threshold, the base station configures a wakeup region indicator for the terminal according to the wakeup region indicator carried by the wakeup signal. In another possible implementation mode, if the terminal transmits a plurality of wakeup signals carrying the same wakeup region indicator, and the received energy of each of the plurality of wakeup signals is greater than or equal to the first signal energy threshold, the base station configures a wakeup region indicator for the terminal according to the wakeup region indicator carried by the plurality of wakeup signals. In another possible implementation mode, if the terminal transmits the information of a plurality of wakeup signals carrying different wakeup region indicators, and the received energy of each of the plurality of wakeup signals is greater than or equal to the second signal energy threshold, the terminal selects one wakeup signal from the plurality of wakeup signals, or selects partial or all wakeup signals from the plurality of wakeup signals, and configures a wakeup region indicator for the terminal according to the wakeup region indicators carried by the selected wakeup signals.

The method that the base station selects one wakeup signal from the plurality of wakeup signals may include: the base station uniformly and randomly selects one wakeup signal from the plurality of wakeup signals, or the base station selects the wakeup signal with the highest received energy from the plurality of wakeup signals, or the base station uses other methods to select the wakeup signals. The methods are not enumerated here.

Alternatively, the base station may configure the wakeup region indicator for the terminal after a set time length. The set period is configurable. During specific implementation, a timer used for updating the wakeup region indicator can be configured, and the timer may be called a wakeup region update timer. When receiving the information, transmitted by the terminal, of the wakeup signal, the base station may initiate the timer. If the base station determines that a wakeup region indicator needs to be configured for the terminal, the base station may implement an operation of configuring a wakeup region indicator when the timer expires. By means of the method, the frequent updating for the wakeup region indicator can be prevented to improve the system stability.

It can be seen through the above flow that the embodiment of the present disclosure realizes updating and maintenance of the wakeup region indicator by means of the terminal receiving the wakeup signal and transmitting the information of the wakeup signal to the base station to cause the base station to configure, according to the wakeup region indicator carried by the satisfactory wakeup signal, the wakeup region indicator for the terminal.

Figure 8:
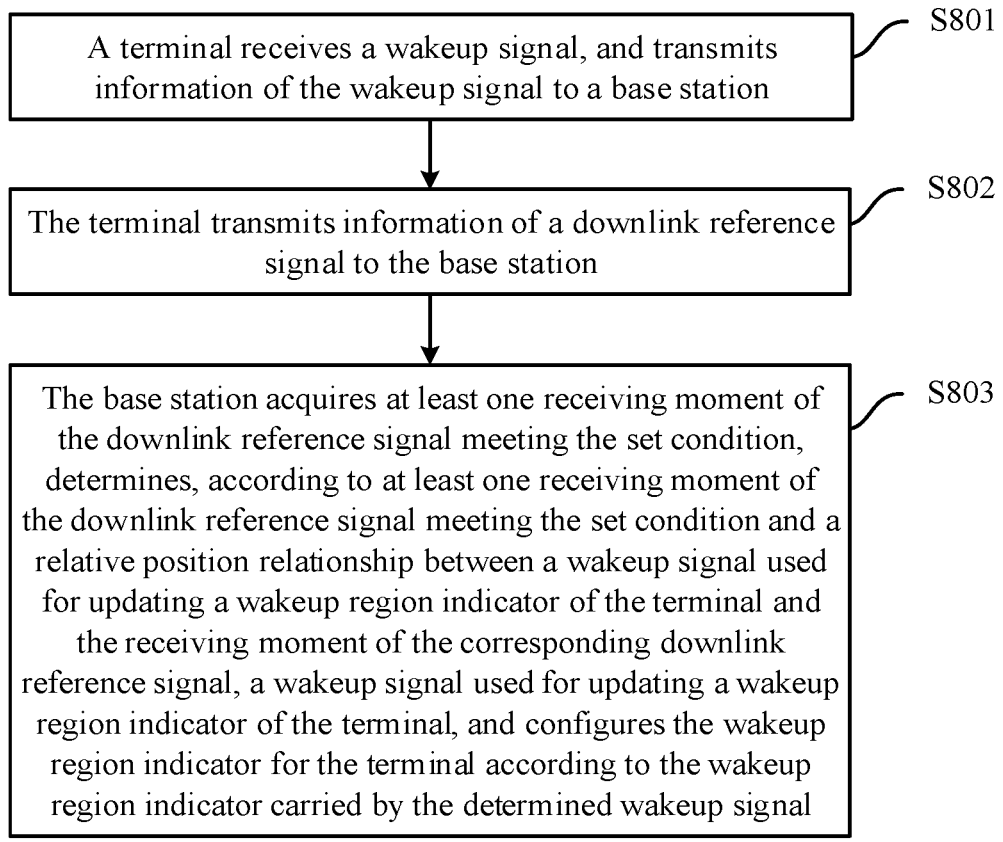
FIG. 8 is yet other schematic diagram of a wakeup region update flow provided by the embodiments of the present disclosure.

Referring to FIG. 8, it is a schematic diagram of a wakeup region update flow provided by the embodiments of the present disclosure. As shown in the figure, the flow may include the following steps.

S801: a terminal receives a wakeup signal, and transmits information of the wakeup signal to a base station.

The information, transmitted by the terminal to the base station, of the wakeup signal includes information of a wakeup signal transmitted by a base station covering a neighboring cell and received by the terminal, and may also include information of a wakeup signal transmitted by other service base stations and received by the terminal.

The wakeup signal carries a wakeup region indicator. The information of the wakeup signal at least includes a wakeup region indicator carried by the wakeup signal.

Alternatively, the information of the wakeup signal may further include a receiving moment of the wakeup signal. Of course, the terminal may not feedback the receiving moment of the wakeup signal, and the base station may determine the receiving moment of the wakeup signal according to an order of receiving signals.

Specific realization of this step may refer to S601 to S602 in FIG. 6, so no more repeated descriptions are provided.

S802: the terminal transmits information of a downlink reference signal to the base station.

The information, transmitted by the terminal to the base station, of the downlink reference signal may include information of a downlink reference signal transmitted by other service base stations and/or a base station covering a neighboring cell and received by the terminal.

The terminal may detect one or more parameters, such as received energy, signal quality, signal interference, a strength indicator and a signal to interference plus noise ratio, of the downlink reference signal, and transmit the detected information of the downlink reference signal to the base station. Types of the downlink reference signals detected by the terminal and detection methods may refer to relevant description of S402 in FIG. 4, and no more repeated descriptions are provided here.

Alternatively, the information of the downlink reference signal may further include a receiving moment of the downlink reference signal. Of course, the terminal may not feedback the receiving moment of the downlink reference signal, and the base station may determine the receiving moment of the downlink reference signal according to an order of receiving signals.

It should be noted that the implementation of S801 and S802 does not have a strict order. S801 or S802 may be implemented for many times.

S803: the base station acquires at least one receiving moment of the downlink reference signal meeting the set condition, determines, according to at least one receiving moment of the downlink reference signal meeting the set condition and a relative position relationship between a wakeup signal used for updating a wakeup region indicator of the terminal and the receiving moment of the corresponding downlink reference signal, a wakeup signal used for updating a wakeup region indicator of the terminal, and configures the wakeup region indicator for the terminal according to the wakeup region indicator carried by the determined wakeup signal.

The set conditions may be pre-appointed, or configured by the base station. Corresponding conditions can be set according to the parameter types of the detected downlink reference signal. In principle, a downlink reference signal with relatively high signal energy or relatively high signal power or relatively good signal quality is obtained by means of the set condition.

When there are many receiving moments of the downlink reference signals meeting the set condition, the relative position relationship between each receiving moment of the downlink reference signal meeting the set condition and the wakeup signal used for updating the wakeup region indicator of the terminal may be respectively determined, and the wakeup signal used for updating the wakeup region indicator of the terminal is determined according to the position relationship. A specific implementation mode may refer to the relevant description of S402 in FIG. 4, and no more repeated descriptions are provided here.

In the above method, one or more receiving moments of the downlink reference signal meeting the set condition may be obtained, so that a receiving position of the wakeup signal used for updating the wakeup region indicator of the terminal is determined according to the receiving moment.

Alternatively, the relative position relationship between the wakeup signal used for updating the wakeup region indicator of the terminal and the receiving moment of the corresponding downlink reference signal may be pre-appointed, or may be configured by the base station. The embodiments of the present disclosure do not limit this. Several cases of the relative position relationship may refer to the relevant description in S403 in FIG. 4, and no more repeated descriptions are provided here.

Alternatively, if there are a plurality of downlink reference signals meeting the set condition, the base station may select one downlink reference signal from the plurality of downlink reference signals meeting the condition, and determine, according to the receiving moment of the selected downlink reference signal and the relative position relationship between the wakeup signal used for updating the wakeup region indicator of the terminal and this receiving moment, a position of the wakeup signal used for updating the wakeup region indicator of the terminal.

The base station can select, according to a set principle, one downlink reference signal from the plurality of downlink reference signals meeting the set condition. For example, the set principle may specifically be uniform and random selection, or may also be to select the firstly received downlink reference signal meeting the above condition, or may be to select the downlink reference signal with the highest received energy or the highest received power or the best signal quality or the least interference.

Alternatively, if the base station determines that the wakeup region indicator carried by the wakeup signal is different from the wakeup region indicator of the terminal, the base station configures the wakeup region indicator carried by the determined wakeup signal for the terminal, otherwise, the base station may not implement an operation of configuring a wakeup region indicator.

Alternatively, the base station may configure the wakeup region indicator for the terminal after a set time length. The set period is configurable. In specific implementation, a timer used for updating the wakeup region indicator may be set. When the base station receives the information of the wakeup signal, the timer may be initiated. If the base station determines that the wakeup region indicator needs to be configured for the terminal, the base station may implement an operation of configuring the wakeup region indicator when the timer expires. By means of the method, the wakeup region indicator can be frequently updated to improve the system stability.

It can be seen from the above flow that the embodiment of the present disclosure determines, according to the receiving position of the satisfactory downlink reference signal, a receiving position of the wakeup signal used for updating the wakeup region indicator of the terminal by means of the terminal receiving the wakeup signal and detecting the downlink reference signal, so that the wakeup region indicator is configured for the terminal according to the wakeup region indicator carried by the wakeup signal received at the receiving position, thereby realizing updating and maintenance of the wakeup region indicator.

Figure 9:
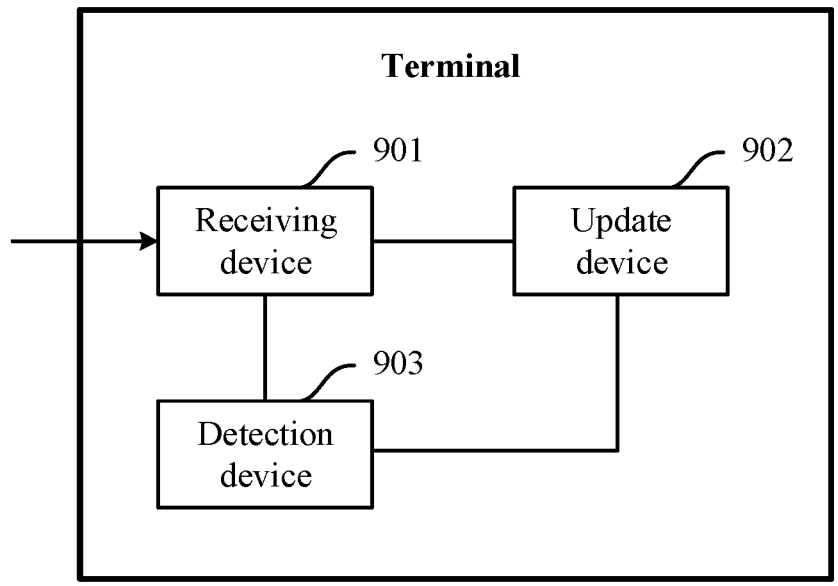
FIG. 9 is a structural schematic diagram of a terminal provided by the embodiments of the present disclosure.

Referring to FIG. 9, it is a structural schematic diagram of a terminal provided by the embodiments of the present disclosure. The terminal may realize the flow described by the foregoing embodiment.

As shown in FIG. 9, the terminal may include: a receiving device 901, an update device 902, and a detection device 903.

The receiving device 901 is configured to receive a wakeup signal, wherein the wakeup signal carries a wakeup region indicator. The update device 902 is configured to update a wakeup region indicator of the terminal according to the wakeup region indicator carried by the received wakeup signal.

Alternatively, the detection device 903 is configured to detect received energy of the wakeup signal. Correspondingly, the update device 902 is specifically configured to: update the wakeup region indicator of the terminal according to the wakeup region indicator carried by the wakeup signal, in the condition that the received energy of the wakeup signal is greater than or equal to a wakeup signal energy threshold.

Alternatively, the detection device 903 is configured to detect one or more received downlink reference signals, and acquire at least one receiving moment of a downlink reference signal meeting the set condition among the one or more downlink reference signals.

Correspondingly, the update device 902 is specifically configured to: determine, according to at least one receiving moment of the downlink reference signal meeting the set condition and a relative position relationship between the wakeup signal used for updating the wakeup region indicator of the terminal and the receiving moment of the corresponding downlink reference signal, a wakeup signal used for updating the wakeup region indicator of the terminal, and update the wakeup region indicator of the terminal according to the wakeup region indicator carried by the determined wakeup signal.

The detection device 903 is specifically configured to: detect received energy of the one or more downlink reference signals, and acquire at least one receiving moment of the downlink reference signal of which the received energy is greater than a reference signal energy threshold among the one or more downlink reference signals; or, detect the signal quality of the one or more downlink reference signal, and acquire at least one receiving moment of the downlink reference signal of which the signal quality is greater than or equal to a signal quality threshold among the one or more downlink reference signals; or, detect received signal strength of the one or more downlink reference signals, and acquire at least one receiving moment of the downlink reference signal of which the received signal strength is less than or equal to a received signal strength threshold among the one or more downlink reference signals; or, detect a signal to interference plus noise ratio of the one or more downlink reference signals, and acquire at least one receiving moment of the downlink reference signal of which the signal to interference plus noise ratio is greater than or equal to a signal to interference plus noise ratio threshold among the one or more downlink reference signals.

Figure 10:
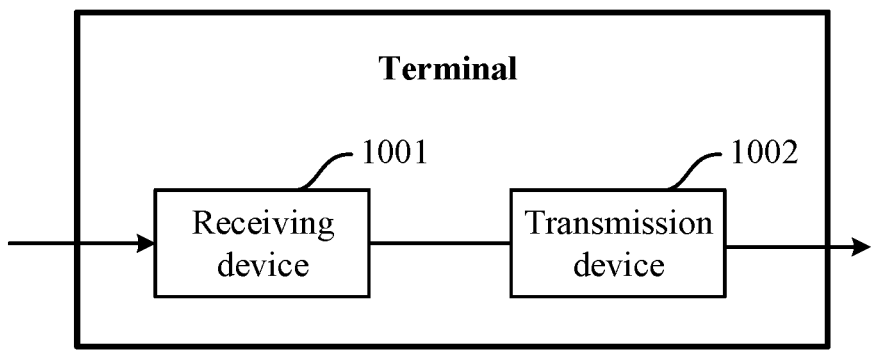
FIG. 10 is another structural schematic diagram of a terminal provided by the embodiments of the present disclosure.

Referring to FIG. 10, it is a structural schematic diagram of a terminal provided by the embodiments of the present disclosure. The terminal may realize the flow described by the foregoing embodiment.

As shown in FIG. 10, the terminal may include: a receiving device 1001 and a transmission device 1002.

The receiving device 1001 is configured to receive a wakeup signal; and the transmission device 1002 is configured to transmit information of the wakeup signal to a base station. The receiving information at least includes a wakeup region indicator carried by the wakeup signal. The receiving device 1001 is also configured to receive a wakeup region indicator configured by the base station for the terminal according to the information of the wakeup signal.

Alternatively, the information of the wakeup signal further includes received energy information of the wakeup signal.

Alternatively, the receiving device 1001 is also configured to receive and detect a downlink reference signal, and obtain information of the downlink reference signal. Correspondingly, the transmission device 1002 is also configured to transmit the information of the downlink reference signal to the base station.

The information of the downlink reference signal includes one or more pieces of the following information: received energy information of the downlink reference signal; signal quality information of the downlink reference signal; received signal strength of the downlink reference signal; and a signal to interference plus noise ratio of the downlink reference signal.

Figure 11:
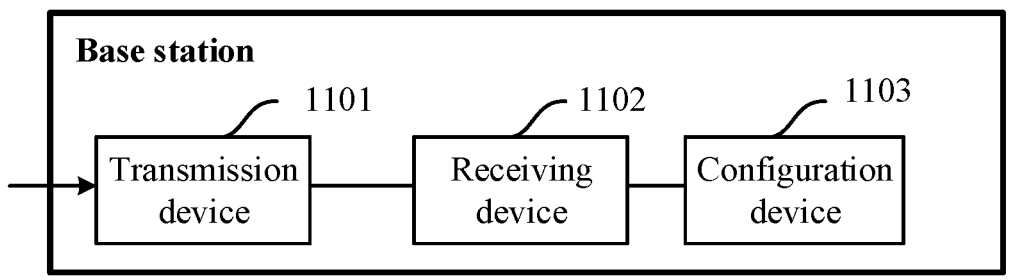
FIG. 11 is a structural schematic diagram of a base station provided by the embodiments of the present disclosure.

Referring to FIG. 11, it is a structural schematic diagram of a base station provided by the embodiments of the present disclosure. The terminal may realize the flow described by the foregoing embodiment.

As shown in FIG. 11, the base station may include: a transmission device 1101, a receiving device 1102, and a configuration device 1103.

The transmission device 1101 is configured to transmit a wakeup signal, wherein the wakeup signal carries a wakeup region indicator. The receiving device 1102 is configured to receive information of a wakeup signal transmitted by a terminal, wherein the information of the wakeup signal includes information of a wakeup signal transmitted by a base station covering a neighboring cell and received by the terminal, and the information of the wakeup signal at least includes a wakeup region indicator carried by the wakeup signal. The configuration device 1103 is configured to configure a wakeup region indicator for the terminal according to the information of the wakeup signal.

Alternatively, the information of the wakeup signal further includes received energy information of the wakeup signal. Correspondingly, the configuration device 1103 is specifically configured to: configure the wakeup region indicator for the terminal according to the wakeup region indicator carried by the wakeup signal of which received energy is greater than or equal to a wakeup signal energy threshold.

Alternatively, the receiving device 1102 is also configured to: receive information, transmitted by the terminal, of a downlink reference signal. The information of the downlink reference signal includes information of a downlink reference signals transmitted by the base station and/or a base station covering a neighboring cell and received by the terminal. Correspondingly, the configuration device 1103 is specifically configured to: acquire at least one receiving moment of a downlink reference signal meeting the set condition, determine, according to at least one receiving moment of the downlink reference signal meeting the set condition and a relative position relationship between a wakeup signal used for updating a wakeup region indicator of the terminal and the receiving moment of the corresponding downlink reference signal, a wakeup signal used for updating a wakeup region indicator of the terminal, and configure the wakeup region indicator for the terminal according to the wakeup region indicator carried by the determined wakeup signal.

The configuration device 1103 is specifically configured to: acquire at least one receiving moment of the downlink reference signal of which the received energy is greater than a reference signal energy threshold; or, acquire at least one receiving moment of the downlink reference signal of which the signal quality is greater than or equal to a signal quality threshold; or, acquire at least one receiving moment of the downlink reference signal of which the received signal strength is less than or equal to a received signal strength threshold; or, acquire at least one receiving moment of the downlink reference signal of which the signal to interference plus noise ratio is greater than or equal to a signal to interference plus noise ratio threshold.

Figure 12:
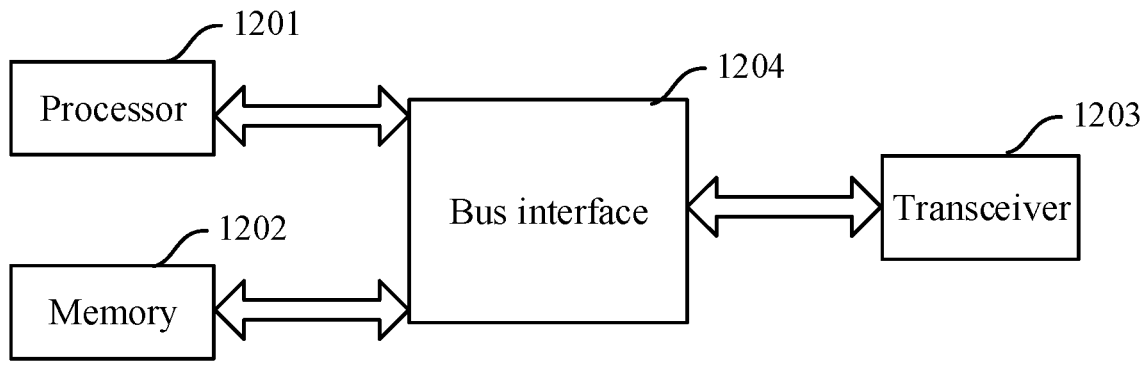
FIG. 12 is a schematic structural diagram of a communication device provided by the embodiments of the present disclosure.

Referring to FIG. 12, it is a structural schematic diagram of a communication device provided by the embodiments of the present disclosure. The communication device may realize the flow implemented on the terminal side in the foregoing embodiment. As shown in the figure, the communication device may include: a processor 1201, a memory 1202, a transceiver 1203, and a bus interface 1204.

The processor 1201 is responsible for managing the bus architecture and performing usual processing, and the memory 1202 may store data used when the processor 1201 performs operations. The transceiver 1203 is configured to receive and transmit data under the control of the processor 1201.

A bus architecture may include any number of interconnected buses and bridges, and is particularly formed by linking one or more of processors represented by the processor 1201 and the various circuits of memories represented by the memory 1202 together. The bus architecture may also link various other circuits such as peripherals, voltage regulators and power management circuits, which are well known in the art and, therefore, will not be further described herein. A bus interface 1204 provides an interface. The processor 1201 is responsible for managing the bus architecture and performing usual processing, and the memory 1202 may store data used when the processor 1201 performs operations.

A flow disclosed by the embodiment of the present disclosure may be applied to the processor 1201, or implemented by the processor 1201. In the realizing process, each step of a processing flow may be completed by integrated logic circuits of hardware in the processor 1201 or instructions in the form of software. The processor 1201 may be a general-purpose processor, a digital signal processor, an application specific integrated circuit, a field programmable gate array or other programmable logic device, a discrete gate or transistor logic device, and a discrete hardware component, and may realize or implement the various methods, steps and logic block diagrams disclosed in the embodiments of the present disclosure. The general-purpose processor may be a microprocessor or any conventional processor. The steps of the method disclosed in conjunction with the embodiment of the present disclosure may be directly embodied as being implemented by a hardware processor, or may be implemented and completed by a combination of hardware and software devices in the processor. The software device may be located in a mature storage medium in the art, such as a random access memory, a flash memory, a read-only memory, a programmable read-only memory, an electrically erasable programmable memory, and a register. The storage medium is located in the memory 1202, and the processor 1201 reads information in the memory 1202 and completes the steps of the signal processing flow in combination with its hardware.

Specifically, the processor 1201 is configured to read programs in the memory 1202, and implement the wakeup region indicator update flow shown in FIG. 2, FIG. 3 or FIG. 4.

Figure 13:
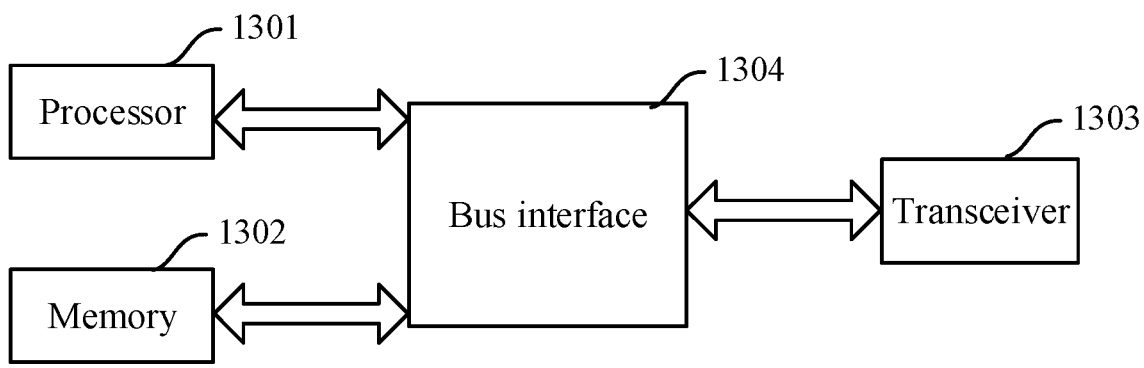
FIG. 13 is another schematic structural diagram of a communication device provided by the embodiments of the present disclosure.

Referring to FIG. 13, it is a structural schematic diagram of a communication device provided by the embodiments of the present disclosure. The communication device may realize the flow implemented on the terminal side and described in the foregoing embodiment. As shown in the figure, the communication device may include: a processor 1301, a memory 1302, a transceiver 1303, and a bus interface 1304.

The processor 1301 is responsible for managing the bus architecture and performing usual processing, and the memory 1302 may store data used when the processor 1301 performs operations. The transceiver 1303 is configured to receive and transmit data under the control of the processor 1301.

A bus architecture may include any number of interconnected buses and bridges, and is particularly formed by linking one or more of processors represented by the processor 1301 and the various circuits of memories represented by the memory 1302 together. The bus architecture may also link various other circuits such as peripherals, voltage regulators and power management circuits, which are well known in the art and, therefore, will not be further described herein. A bus interface 1304 provides an interface. The processor 1301 is responsible for managing the bus architecture and performing usual processing, and the memory 1302 may store data used when the processor 1301 performs operations.

A flow disclosed by the embodiment of the present disclosure may be applied to the processor 1301, or implemented by the processor 1301. In the realizing process, each step of a processing flow may be completed by integrated logic circuits of hardware in the processor 1301 or instructions in the form of software. The processor 1301 may be a general-purpose processor, a digital signal processor, an application specific integrated circuit, a field programmable gate array or other programmable logic device, a discrete gate or transistor logic device, and a discrete hardware component, and may implement or implement the various methods, steps and logic block diagrams disclosed in the embodiments of the present disclosure. The general-purpose processor may be a microprocessor or any conventional processor. The steps of the method disclosed in conjunction with the embodiment of the present disclosure may be directly embodied as being implemented by a hardware processor, or may be implemented and completed by a combination of hardware and software devices in the processor. The software device may be located in a mature storage medium in the art, such as a random access memory, a flash memory, a read-only memory, a programmable read-only memory, an electrically erasable programmable memory, and a register. The storage medium is located in the memory 1302, and the processor 1301 reads information in the memory 1302 and completes the steps of the signal processing flow in combination with its hardware.

Specifically, the processor 1301 is configured to read programs in the memory 1302, and implement the wakeup region indicator update flow implemented on the terminal side and shown in FIG. 6, FIG. 7 or FIG. 8.

Figure 14:
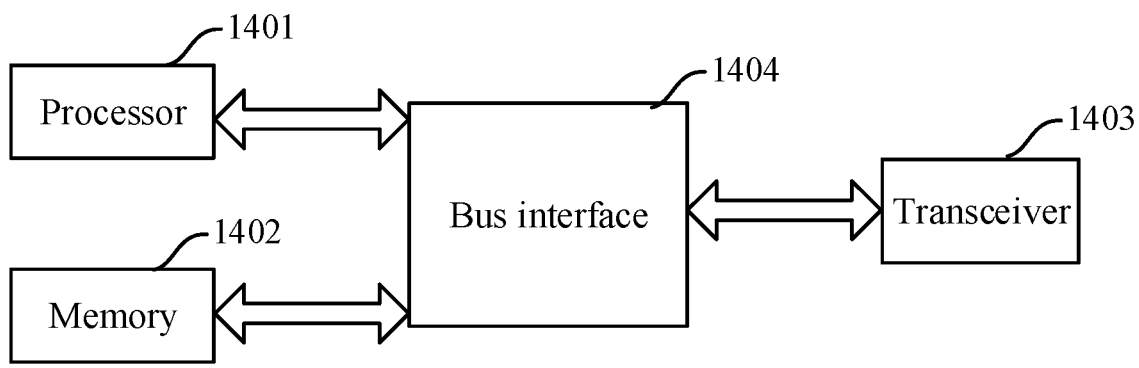
FIG. 14 is yet another schematic structural diagram of a communication device provided by the embodiments of the present disclosure.

Referring to FIG. 14, it is a structural schematic diagram of a communication device provided by the embodiments of the present disclosure. The communication device may realize the flow implemented on the base station side and described in the foregoing embodiment. As shown in the figure, the communication device may include: a processor 1401, a memory 1402, a transceiver 1403, and a bus interface 1404.

The processor 1401 is responsible for managing the bus architecture and performing usual processing, and the memory 1402 may store data used when the processor 1401 performs operations. The transceiver 1403 is configured to receive and transmit data under the control of the processor 1401.

A bus architecture may include any number of interconnected buses and bridges, and is particularly formed by linking one or more of processors represented by the processor 1401 and the various circuits of memories represented by the memory 1402 together. The bus architecture may also link various other circuits such as peripherals, voltage regulators and power management circuits, which are well known in the art and, therefore, will not be further described herein. A bus interface 1404 provides an interface. The processor 1401 is responsible for managing the bus architecture and performing usual processing, and the memory 1402 may store data used when the processor 1401 performs operations.

A flow disclosed by the embodiment of the present disclosure may be applied to the processor 1401, or realized by the processor 1401. In the realizing process, each step of a processing flow may be completed by integrated logic circuits of hardware in the processor 1401 or instructions in the form of software. The processor 1401 may be a general-purpose processor, a digital signal processor, an application specific integrated circuit, a field programmable gate array or other programmable logic device, a discrete gate or transistor logic device, and a discrete hardware component, and may implement or implement the various methods, steps and logic block diagrams disclosed in the embodiments of the present disclosure. The general-purpose processor may be a microprocessor or any conventional processor. The steps of the method disclosed in conjunction with the embodiment of the present disclosure may be directly embodied as being implemented by a hardware processor, or may be implemented and completed by a combination of hardware and software devices in the processor. The software device may be located in a mature storage medium in the art, such as a random access memory, a flash memory, a read-only memory, a programmable read-only memory, an electrically erasable programmable memory, and a register. The storage medium is located in the memory 1402, and the processor 1401 reads information in the memory 1402 and completes the steps of the signal processing flow in combination with its hardware.

Specifically, the processor 1401 is configured to read programs in the memory 1402, and implement the wakeup region indicator update flow implemented on the base station side and shown in FIG. 6, FIG. 7 or FIG. 8.

Based on the embodiments of the present disclosure further provide a computer-readable storage medium. The computer-readable storage medium stores computer-executable instructions. The computer-executable instructions are configured to cause a computer to implement the wakeup region indicator update flows in the foregoing embodiments.

Based on the embodiments of the present disclosure further provide a computer-readable storage medium. The computer-readable storage medium stores computer-executable instructions. The computer-executable instructions are configured to cause a computer to implement the wakeup region indicator configuration flows in the foregoing embodiments.

The present disclosure is described by referring to flowcharts and/or block diagrams of methods, devices (systems) and computer program products according to the embodiments of the present application. It should be understood that computer program instructions may implement each flow and/or each block in the flowcharts and/or the block diagrams and combination of the flows and/or the blocks in the flow diagrams and/or the block diagrams. These computer program instructions may be provided for a general computer, a dedicated computer, an embedded processor or processing units of other programmable data processing devices to generate a machine, thereby making the instructions that are implemented by the computer or the processing units of other programmable data processing devices generate apparatuses for realizing specified functions in one or multiple flows of the flow diagrams and/or one or multiple blocks of the block diagrams.

These computer program instructions also may be stored in a computer readable memory capable of guiding the computer or other programmable data processing devices to work in a specific manner, thereby making the instructions that are stored in the computer readable memory generate manufactured products that include instruction apparatuses. The instruction apparatuses realize the specified functions in one or multiple flows of the flow diagrams and/or one or multiple blocks of the block diagrams.

These computer program instructions also may be loaded onto the computer or other programmable data processing devices to implement a series of operation steps on the computer or other programmable data processing devices to generate computer implemented processing, so that the instructions implemented on the computer or other programmable data processing devices provide steps for realizing the specified functions in one or multiple flows of the flow diagrams and/or one or multiple blocks of the block diagrams.

What is claimed is:

1. A wakeup signal region update method, comprising:
receiving, by a terminal, a wakeup signal, wherein the wakeup signal carries a wakeup region indicator;
updating, by the terminal, a wakeup region indicator of the terminal according to the wakeup region indicator carried by the wakeup signal received;
detecting, by the terminal, one or more downlink reference signals received by the terminal; and
acquiring, by the terminal, at least one receiving moment of a downlink reference signal meeting a set condition among the one or more downlink reference signals; wherein
the updating, by the terminal, the wakeup region indicator of the terminal according to the wakeup region indicator carried by the wakeup signal received comprises:
determining, by the terminal, a wakeup signal used for updating the wakeup region indicator of the terminal according to at least one receiving moment of the downlink reference signal meeting the set condition and a relative position relationship between the wakeup signal used for updating the wakeup region indicator of the terminal and the receiving moment of the corresponding downlink reference signal; and
updating, by the terminal, the wakeup region indicator of the terminal according to the wakeup region indicator carried by the wakeup signal determined;
the detecting, by the terminal, the one or more downlink reference signals received by the terminal, and the acquiring, by the terminal, at least one receiving moment of a downlink reference signal meeting the set condition among the one or more downlink reference signals comprises:
detecting, by the terminal, received energy of the one or more downlink reference signals, and acquiring, by the terminal, at least one receiving moment of the downlink reference signal of which the received energy is greater than a reference signal energy threshold among the one or more downlink reference signals; or
detecting, by the terminal, signal quality of the one or more downlink reference signals, and acquiring, by the terminal, at least one receiving moment of the downlink reference signal of which the signal quality is greater than or equal to a signal quality threshold among the one or more downlink reference signals; or
detecting, by the terminal, received signal strength of the one or more downlink reference signals, and acquiring, by the terminal, at least one receiving moment of the downlink reference signal of which the received signal strength is less than or equal to a received signal strength threshold among the one or more downlink reference signals.

2. The method according to claim 1, wherein the relative position relationship between the wakeup signal used for updating the wakeup region indicator of the terminal and the receiving moment of the corresponding downlink reference signal comprises that:
- the wakeup signal used for updating the wakeup region indicator of the terminal is at least one wakeup signal received within a period closest to the receiving moment of the downlink reference signal; or
- the wakeup signal used for updating the wakeup region indicator of the terminal is at least one wakeup signal received within a period before the receiving moment of the downlink reference signal and closest to the receiving moment; or
- the wakeup signal used for updating the wakeup region indicator of the terminal is at least one wakeup signal received after the receiving moment of the downlink reference signal and closest to the receiving moment.

3. The method according to claim 1, wherein the updating, by the terminal, the wakeup region indicator of the terminal according to the wakeup region indicator carried by the wakeup signal received comprises:
- detecting, by the terminal, a wakeup region update timer; and
- updating, by the terminal, the wakeup region indicator of the terminal according to the wakeup region indicator carried by the wakeup signal received in the condition that the wakeup region update timer expires.

4. A wakeup signal region update method, comprising:
- receiving, by a terminal, a wakeup signal;
- transmitting, by the terminal, information of the wakeup signal to a base station, wherein the information of the wakeup signal at least comprises a wakeup region indicator carried by the wakeup signal;
- receiving, by the terminal, a wakeup region indicator configured, according to the information of the wakeup signal, by the base station for the terminal;
- detecting, by the terminal, a downlink reference signal received by the terminal;
- obtaining, by the terminal, information of the downlink reference signal; and
- transmitting, by the terminal, the information of the downlink reference signal to the base station;
- wherein the information of the downlink reference signal comprises one or more pieces of the following information:
- received energy information of the downlink reference signal;
- signal quality information of the downlink reference signal;
- received signal strength of the downlink reference signal.

5. A wakeup signal region update method, comprising:
- transmitting, by a base station, a wakeup signal, wherein the wakeup signal carries a wakeup region indicator;
- receiving, by the base station, information, transmitted by a terminal, of a wakeup signal, wherein the information of the wakeup signal comprises information of a wakeup signal transmitted by a base station covering a neighboring cell and received by the terminal, and the information of the wakeup signal at least comprises a wakeup region indicator carried by the wakeup signal;
- configuring, by the base station, a wakeup region indicator for the terminal according to the information of the wakeup signal; and
- receiving, by the base station, information, transmitted by the terminal, of a downlink reference signal, wherein the information of the downlink reference signal comprises information of downlink reference signals transmitted by the base station and/or the base station covering the neighboring cell and received by the terminal; wherein the configuring, by the base station, the wakeup region indicator for the terminal according to the information of the wakeup signal comprises:
- acquiring, by the base station, at least one receiving moment of a downlink reference signal meeting a set condition;
- determining, by the base station, a wakeup signal used for updating the wakeup region indicator of the terminal according to at least one receiving moment of the downlink reference signal meeting the set condition and a relative position relationship between the wakeup signal used for updating the wakeup region indicator of the terminal and the receiving moment of the corresponding downlink reference signal; and
- configuring, by the base station, the wakeup region indicator for the terminal according to the wakeup region indicator carried by the wakeup signal determined;

the acquiring, by the base station, at least one receiving moment of the downlink reference signal meeting the set condition comprises:
- acquiring, by the base station, at least one receiving moment of the downlink reference signal of which received energy is greater than a reference signal energy threshold; or
- acquiring, by the base station, at least one receiving moment of the downlink reference signal of which signal quality is greater than or equal to a signal quality threshold; or
- acquiring, by the base station, at least one receiving moment of the downlink reference signal of which received signal strength is less than or equal to a received signal strength threshold.

6. The method according to claim 5, wherein the relative position relationship between the wakeup signal used for updating the wakeup region indicator of the terminal and the receiving moment of the corresponding downlink reference signal comprises that:
- the wakeup signal used for updating the wakeup region indicator of the terminal is at least one wakeup signal received within a period closest to the receiving moment of the downlink reference signal; or
- the wakeup signal used for updating the wakeup region indicator of the terminal is at least one wakeup signal received within a period before the receiving moment of the downlink reference signal and closest to the receiving moment; or
- the wakeup signal used for updating the wakeup region indicator of the terminal is at least one wakeup signal received after the receiving moment of the downlink reference signal and closest to the receiving moment.

7. The method according to claim 5, wherein the configuring, by the base station, the wakeup region indicator for the terminal according to the information of the wakeup signal comprises:
- detecting, by the base station, a wakeup region update timer; and
- configuring, by the base station, the wakeup region indicator for the terminal according to the information of the wakeup signal in the condition that the wakeup region update timer expires.

8. A communication device, comprising: a processor, a memory and a transceiver, wherein the processor is configured to read programs in the memory to perform the method of claim 1.

9. A communication device, comprising: a processor, a memory and a transceiver, wherein the processor is configured to read programs in the memory to perform the method of claim 4.

10. A communication device, comprising: a processor, a memory and a transceiver, wherein the processor is configured to read programs in the memory to perform the method of claim 5.

* * * * *